(12) United States Patent
Denninghoff et al.

(10) Patent No.: US 6,754,855 B1
(45) Date of Patent: Jun. 22, 2004

(54) AUTOMATED RECOVERY OF COMPUTER APPLIANCES

(75) Inventors: Karl L. Denninghoff, Bothell, WA (US); Todd L. Paul, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/452,534

(22) Filed: Dec. 1, 1999

(51) Int. Cl.$^7$ ................................................. G06F 11/00
(52) U.S. Cl. ........................... 714/48; 714/25; 714/44; 714/47
(58) Field of Search ............................ 714/47, 44, 25, 714/48

(56) References Cited

U.S. PATENT DOCUMENTS

| | | | | |
|---|---|---|---|---|
| 4,866,713 A | * | 9/1989 | Worger et al. | 714/25 |
| 5,274,797 A | * | 12/1993 | Barlow et al. | 714/47 |
| 5,621,663 A | * | 4/1997 | Skagerling | 714/47 |
| 5,708,776 A | | 1/1998 | Kikinis | 395/185.08 |
| 5,732,268 A | | 3/1998 | Bizzarri | 395/652 |
| 5,740,357 A | * | 4/1998 | Gardiner et al. | 714/57 |
| 5,956,475 A | | 9/1999 | Burckhartt et al. | 395/182.21 |
| 6,000,046 A | * | 12/1999 | Passmore | 714/47 |
| 6,463,550 B1 | * | 10/2002 | Cepulis et al. | 714/25 |
| 6,519,717 B1 | * | 2/2003 | Williams et al. | 714/37 |
| 2003/0163764 A1 | * | 8/2003 | Williams et al. | 714/25 |

OTHER PUBLICATIONS

Tanenbaum, Andrew S., Structured Computer Organization, 1990, Prentice Hall Inc., Third Edition, pp. 11–13.*

* cited by examiner

Primary Examiner—Robert Beausoliel
Assistant Examiner—Michael Maskulinski
(74) Attorney, Agent, or Firm—Lee & Hayes, PLLC

(57) ABSTRACT

Aspects of the invention provide methods and architectures for enhancing the reliability of computer appliances and reducing the possibilities that human intervention is necessary in the event of a system failure or failure condition. The provided architecture is extensible and provides a generalized framework that is adaptable to many different types of computer appliances. One aspect of the invention provides a boot up redundancy component to ensure that a computer appliance can be appropriately booted. In the described embodiment, the appliance hard drive is configured with multiple partitions that can be utilized to boot the appliance thereby reducing the chances that the appliance will not boot. In addition, an architecture is disclosed that comprises one or more resource monitoring components that monitor an associated appliance resource for a failure condition. The resource monitoring components are programmed to attempt to remedy certain failure conditions that they detect. An appliance monitoring service is also provided and is programmed to attempt to remedy failure conditions that are not remedied by one or more of the resource monitoring objects.

19 Claims, 6 Drawing Sheets

AUTOMATED RECOVERY OF COMPUTER APPLIANCES

TECHNICAL FIELD

This invention relates generally to computer appliances and, more particularly, concerns automated recovery and reliability methods and systems.

BACKGROUND

Computer appliances are becoming ever more popular. A "computer appliance" is a computing device that is similar in some respects to a general purpose computer. That is, a computer appliance can typically have many of the same constituent components that a general purpose computer has (e.g. one or more microprocessors, storage devices, memory, an operating system and the like). Computer appliances are different, however, because they typically have a fixed function that does not or cannot vary. Specifically, computer appliances are designed and programmed to implement very specific types of functionality. Many different types of computer appliances can exist. For example, a server appliance can be designed to implement functionalities that include file sharing, Internet sharing, and print sharing. Other types of appliances can include set top boxes that are used in connection with viewing multimedia presentations on a television, or hardware systems that are designed to control a home security system. In addition to having a fixed functionality, computer appliances are often characterized in that they sell for a price that is much less than that of a general purpose computer. This is due, at least in part, to the fact that computer appliances are designed to do only a limited number of things. In addition, computer appliances are often of a form factor that can be "transparent" to the owner or user. That is, a user can simply "tuck" the computer appliance away and, after a while, may not even be aware that it exists (except for the fact that the appliance is implementing a functionality that the user desires). Another characterizing feature of some computer appliances is that they can lack a user display and/or other mechanisms that allow a user to interact with them (e.g. a keyboard, mouse input etc.). This is much different from a general purpose computer that typically has a display through which it can communicate with a user and user mechanisms such as a keyboard and mouse input. This is an important distinction when consideration is given to the problems that the current invention is directed to solving.

Computer appliances, by their very nature, are designed to execute software. That is, specific software applications and operating systems can be designed for operation in connection with the different appliances. And, because the functionalities of appliances can vary widely, so too can the software applications and operating systems with which they are used. Often times, software applications (such as device drivers) and operating systems for these computer appliances are designed by third parties known as original equipment manufacturers (or OEMs). As careful as designers of software and operating systems are, however, there are still instances when the software or a particular resource that is designed to operate on the appliance will fail. A "resource" refers to any type of hardware, software, or firmware resource that is used by the appliance to implement its functionality. For example, hardware resources can include, without limitation, communication lines, printers and the like. Software resources can include, without limitation, software applications, memory managers and the like.

It is highly desirable that computer appliances operate in a dependable, reliable manner. If a computer appliance experiences a system failure, for whatever reason, an end user is not usually going to be able to fix it (other than perhaps by shutting the appliance down and restarting it). This is quite different from a general purpose computer which, in many instances, will use the display to advise the user that there has been a particular system failure and might display a graphic user interface (GUI) to step the user through a remedial procedure. Many times, though, the general purpose computer's system failure will require specialized knowledge which the end user simply does not have. In that case, the end user may have to contact a "1-800" help line to have a trouble shooter fix the problem. At any rate, system failures typically require human intervention.

In the context of many computer appliances, system failures are even more difficult to fix because of the absence of a display or user interface to advise the user of a problem.

Accordingly, this invention arose out of concerns associated with improving the operability and reliability of computer appliances and further enhancing the user experience thereof.

SUMMARY

Two primary goals for an ideal computer appliance are that: (1) it run for an extended period of time (i.e. months) without user intervention, and (2) it run without a disruption of user services.

To achieve these and other goals, aspects of the invention provide methods and architectures for enhancing the reliability of computer appliances and reducing the possibilities that human intervention is necessary in the event of a system failure or failure condition. The provided architecture is extensible and provides a generalized framework that is adaptable to many different types of computer appliances.

One aspect of the invention provides a boot up redundancy component to ensure that a computer appliance can be appropriately booted. In the described embodiment, a single hard disk is configured for use in a single computer appliance. A second disk (mirror disk) can also be used to enhance reliability. In this case the system BIOS will boot from the secondary disk (which is configured exactly like the primary disk) if the primary disk fails (e.g. a hardware failure). A first operating system is resident on the single hard disk and is configured for booting the computer appliance. In addition, a second operating system is resident on the single hard disk and is configured for booting the computer appliance. The second operating system serves as a back up for the first operating system in the event that the computer appliance cannot be booted from the first operating system.

Another aspect of the invention provides an appliance-booting method that first attempts to boot the appliance from a first partition of a hard drive containing a first operating system. If this attempt is unsuccessful, then a second attempt to boot the computer appliance is made from a second partition of the hard drive. The second partition contains a second operating system that is configured as a back up operating system for the first operating system. The backup operating system can serve as a "pristine" operating system (in that it only functions to restore the first or "primary" operating system to a working state) or a fully functional system providing end user services. The preferable configuration is for the backup operating system to serve as a "pristine" operating system. A pristine operating system restores the primary operating system by quick formatting the primary operating system partition and then installing a copy of the primary operating system onto the newly formatted partition. The pristine operating system can also restore configuration settings of end user services when service configuration checkpointing (i.e. saving changes to service configuration in a location accessible from both the primary and pristine operating systems) is employed from the primary operating system.

Another aspect of the invention makes use of a "boot count variable". The boot count variable is a variable that keeps track of the number of times attempts are made to boot a particular appliance. Each time an attempt is made to boot the appliance from a selected disk partition, the boot count variable is incremented. When the boot count variable reaches a certain threshold value after the appliance has not been successfully booted from the selected disk partition, another disk partition is utilized, if available, to attempt to boot the appliance. In this manner, software redundancy is provided and reliability is enhanced.

Another aspect of the invention provides an architecture for use in monitoring for, and attempting to remedy failure conditions that are associated with various resources of a computer appliance. In the described embodiment, one or more resource monitoring components are provided. Individual resource monitoring components are programmed to monitor the status of an associated computer appliance resource and to detect a failure condition in which the resource cannot be used by the computer appliance for its intended purpose. At least some of the resource monitoring components are programmed to attempt to remedy the failure condition in the event that the resource monitoring component detects a failure condition. An appliance monitoring service is provided and is configured to be in communication with the resource monitoring components. The appliance monitoring service is programmed to attempt to remedy failure conditions that cannot be remedied by the resource monitoring components. In the described embodiment, the resource monitoring components are implemented as programming objects having callable interfaces. In addition, the appliance monitoring service comprises an appliance monitor object and a global recovery object having callable interfaces. The appliance monitoring object can be called by one or more of the resource monitoring objects to report a resource failure condition. The appliance monitoring object can then call the global recovery object which contains a collection of recovery algorithms that can be implemented to recover the appliance.

Embodiments of the invention provide an automated, flexible, extendable appliance recovery system that greatly reduces that chances that human intervention is needed to recover an appliance that has experienced a system failure. In addition, the inventive methods and systems reduce the possibility that a particular system failure will disrupt end user services.

DETAILED DESCRIPTION

Exemplary Appliance System

Figure 1:
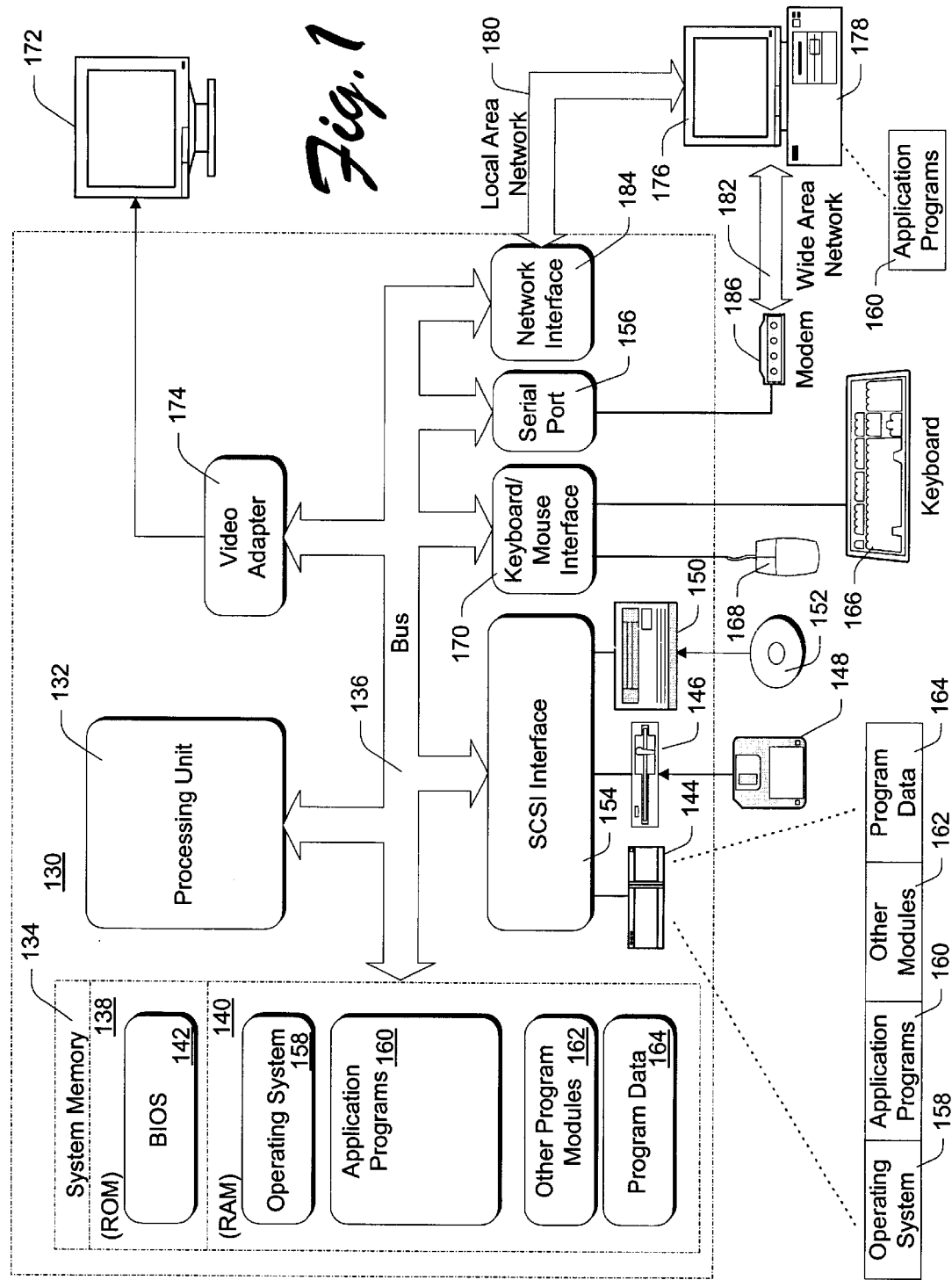
FIG. 1 is a diagram of an exemplary computer appliance that can be utilized in connection with the described embodiment.

FIG. 1 shows a general example of a computer appliance 130 that can be used in accordance with the described embodiment.

Computer appliance 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer appliance 130, such as during boot up, is stored in ROM 138.

Computer appliance 130 further includes a hard drive 144 for reading from and writing to one or more hard disks (not shown). Some computer appliances can include a magnetic disk drive 146 for reading from and writing to a removable magnetic disk 148, and an optical disk drive 150 for reading from or writing to a removable optical disk 152 such as a CD ROM or other optical media. The hard drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer appliance 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158 one or more application programs 160, other program modules 162, and program data 164. In some computer appliances, a user might enter commands and information into computer appliance 130 through input devices such as a keyboard 166 and a pointing device 168. Other input devices (not shown) may include a microphone, joystick, game pad, satellite dish, scanner, or the like. In some instances, however, a computer appliance might not have these types of input devices. These and other input devices are connected to the processing unit 132 through an interface 170 that is coupled to the bus 136. In some computer appliances, a monitor 172 or other type of display device might also connected to the bus 136 via an interface, such as a video adapter 174. Some appliances, however, do not have these types of display devices. In addition to the monitor, computer appliances might include other peripheral output devices (not shown) such as speakers and printers.

Computer appliance 130 can, but need not, operate in a networked environment using logical connections to one or more remote computers or other computer appliances, such as a remote computer 176. The remote computer 176 may be another personal computer, a server, a router, a network PC, a peer device or other common network node, and typically includes many or all of the elements described above relative to computer appliance 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer appliance 130 is connected to the local network 180 through a network interface or adapter 184. When used in a WAN networking environment, computer appliance 130 typically includes a modem 186 or other means for establishing communications over the wide area network 182, such as the Internet. The modem 186, which may be internal or external, is connected to the bus 136 via a serial port interface 156. In a networked environment, program modules depicted relative to the computer appliance 130, or portions thereof, may be stored in the remote memory storage device. It will be appreciated that the network connections shown are exemplary and other means of establishing a communications link between the computers may be used.

Generally, the data processors of computer appliance 130 are programmed by means of instructions stored at different times in the various computer-readable storage media of the computer. Programs and operating systems are typically distributed, for example, on floppy disks or CD-ROMs. From there, they are installed or loaded into the secondary memory of a computer appliance. At execution, they are loaded at least partially into the computer appliance's primary electronic memory. The invention described herein includes these and other various types of computer-readable storage media when such media contain instructions or programs for implementing the steps described below in conjunction with a microprocessor or other data processor. The invention also includes the computer appliance itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Overview

Aspects of the invention provide computer appliances having enhanced reliability (as measured by mean time between system failures). Software redundancy is provided in the form of multiple operating systems that can be used to attempt to boot the computer appliance. The terms "boot", "booting", and "boot-up" as used in the context of this document, are intended to include those activities undertaken by a computer appliance to bring it into an operational state from either an unpowered state or a powered but unresponsive or problematic state. A cold boot is typically initiated by simply turning the appliance on and usually includes a Power-On Self-Test (POST) that checks system memory. A warm boot is typically initiated from a powered state and does not usually include the POST check. The warm boot is typically initiated when the computer appliance is unresponsive or has experienced a system failure from which recovery is not possible other than through a warm boot. The boot process (which is built into the computer appliance's BIOS component), however initiated, then proceeds to load the system files needed to bring the computer appliance's operating system (or user interface) into a state of readiness.

In the described embodiment, one or more hard disks are partitioned to include their own operating systems. The computer appliance first attempts to boot from a first of the hard disk partitions. If this attempt fails, then a second of the partitions is utilized to attempt booting the appliance. In the described embodiment, a primary operating system (possibly having user-defined settings) and a "pristine" operating system (having the manufacturer's default settings) are provided on a common hard disk. If booting fails from the partition containing the primary operating system, the pristine system is used to restore the primary operating system. In this manner, booting is attempted from the partition containing the pristine operating system. In addition, aspects of the invention can restore, to the extent possible, the user-defined settings that might have been set on the primary operating system. In addition, further hardware/software redundancy is provided in the form of a mirror disk that includes copies of the primary and pristine operating systems. In the event that the computer appliance cannot be booted from the disk containing the primary and pristine operating systems, the appliance or, more accurately the appliance's BIOS component attempts to boot from the mirror disk. In the event that boot up fails from both of these disks, the computer appliance enters a diagnostic mode in which the system failure can be addressed in a more specific manner that is unique to the particular appliance. By providing for software redundancy, particularly when booting an appliance, the likelihood that a system failure would prevent the appliance from operating for its intended purpose is reduced.

In a particular implementation, the concept of a "boot count variable" is utilized as an accounting measure to track the number of boot attempts that are made relative to any one of the hard disk partitions. Each time an attempt is made to boot the appliance from a selected disk partition, the boot count variable is incremented. When the boot count variable reaches a certain threshold value after the appliance has not been successfully booted from the selected disk partition, a determination is made as to whether there is another disk partition that can be utilized to boot the appliance. If there is another disk partition, the boot count variable is reset and booting is again attempted using the next disk partition. This process continues until there are no more disk partitions from which to boot. At that point, the appliance can enter the diagnostic mode. In this manner, attempts to boot an appliance can be made a measurable number of times before switching over to another disk partition. All of this processing takes place without the need for human intervention.

In another implementation, a unique extendable architecture is provided for use in monitoring for, and attempting to remedy failure conditions that are associated with various resources of a computer appliance. In the described embodiment, one or more resource monitoring components are provided. Individual resource monitoring components are programmed to monitor the status of an associated computer appliance resource and to detect a failure condition in which the resource cannot be used by the computer appliance for its intended purpose. At least some of the resource monitoring components are programmed to attempt to remedy the failure condition in the event that the resource monitoring component detects a failure condition. An appliance monitoring service is provided and is configured to be in communication with the resource monitoring components. The appliance monitoring service is programmed to attempt to remedy failure conditions that cannot be remedied by the resource monitoring components. In the described embodiment, the resource monitoring components are implemented as programming objects with interfaces that can be called, for example, to initiate their monitoring functions.

In addition, the appliance monitoring service comprises an appliance monitor object and a global recovery object having callable interfaces. The appliance monitoring object can be called by one or more of the resource monitoring objects to report a resource failure condition, e.g. in the event that the failure condition is one that cannot be remedied by the resource monitoring object. Responsive to receiving a call from a resource monitoring object, the appliance monitoring object can then call the global recovery object which contains a collection of recovery algorithms that can be implemented to recover the appliance.

Aspects of the invention provide an automated, flexible, extendable appliance recovery system that greatly reduces the chances that human intervention is needed to recover an appliance that has experienced a system failure. In addition, the inventive methods and systems reduce the possibility that a particular system failure will disrupt end user services.

Redundancy Software/Hardware Component

Figure 2:
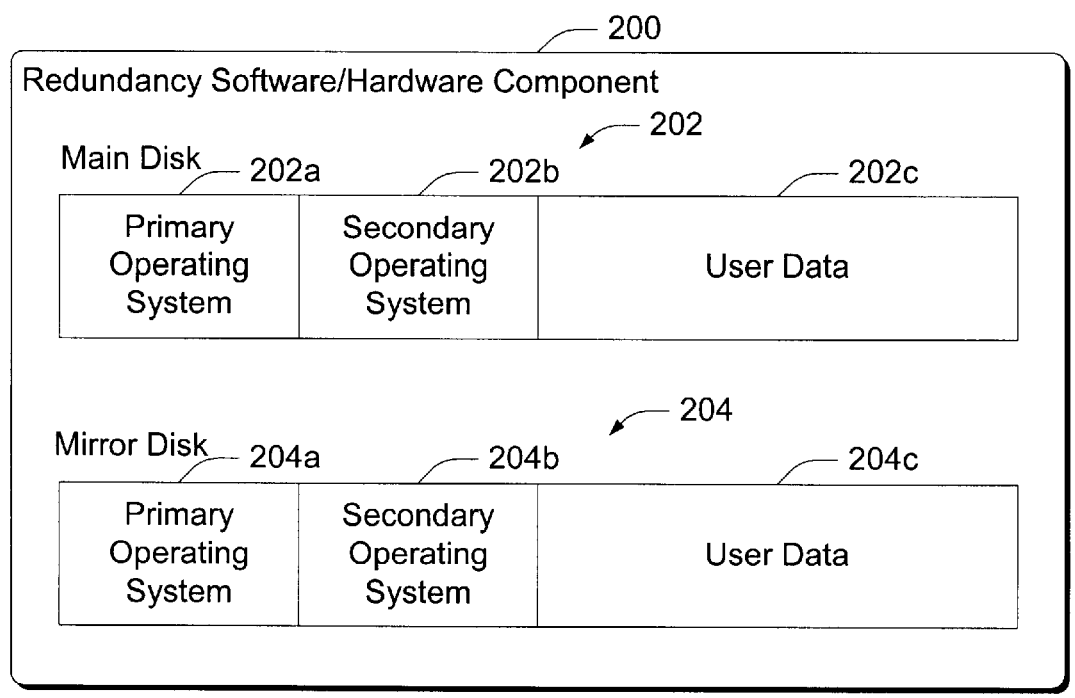
FIG. 2 is a block diagram of an exemplary redundancy software/hardware component in accordance with the described embodiment.

FIG. 2 shows an exemplary redundancy software/hardware component 200 that is designed to reduce the chances that a system failure during boot up of a computer appliance will impair the appliance's ability to perform its intended function. Component 200 includes first and second computer readable media 202, 204 which, in this example comprise part of the appliance's hard drive. In this specific example, each media 202, 204 comprises a separate single hard disk that is resident in a single computer appliance, with media 202 constituting a main disk and media 204 constituting a mirror disk. The mirror disk is named as such because it generally mirrors or contains copies of the software code that is resident on the main disk.

In this example, each of disk's 202, 204 are allocated into different portions or partitions that contain code that implements an operating system. In the context of this document, a computer appliance's "operating system" is considered to include, without limitation, all of the software code that is necessary in order for the appliance to implement its designed functionality. As functionalities between appliances can differ, so too can the operating systems that are programmed to implement those functionalities. Thus, the inventive subject matter has applicability to a wide variety of operating systems.

In the present example, disk 202 has been allocated to include two partitions 202a, 202b that have code stored thereon that implements the computer appliance's operating system. Partition 202a contains a so-called primary (first) operating system, and partition 202b contains a so-called secondary (or second, pristine) operating system. Similarly, partition 204a contains a primary (or third) operating system and partition 204b contains a secondary (or fourth, pristine) operating system. Partitions 202c, 204c contain user data that can be used to adjust settings in the operating system (i.e. the primary operating system). The primary operating systems may have user settings that have been set by a particular user. The pristine operating systems, in this example, are operating systems that come with the manufacturers' settings. The secondary operating systems can serve as a "pristine" operating system in that it only functions to restore the first or "primary" operating system to a working state. Alternately, the secondary operating systems can function as a fully functional operating system that provides end user services. The preferable configuration is for the backup operating system to serve as a "pristine" operating system. A pristine operating system restores the primary operating system by quick formatting the primary operating system partition and then installing a copy of the primary operating system onto the newly formatted partition. The pristine operating system can also restore configuration settings of end user services when service configuration checkpointing (i.e. saving changes to service configuration in a location accessible from both the primary and pristine operating systems) is employed from the primary operating system.

Each of partitions 202a, 202b, 204a, 204b contain code that implements an operating system that is configured for use in booting up the computer appliance. The second operating system that is resident on partition 202b serves as a back up operating system for the first operating system that is resident on partition 202a. Similarly, the fourth operating system that is resident on partition 204b serves as a back up operating system for the third operating system that is resident on partition 202a. The BIOS component of the computer appliance is programmed or is programmable to first attempt to boot the appliance using a primary operating system. In the event that the appliance cannot be booted from a primary operating system, the BIOS component is programmed or programmable to attempt to boot the computer appliance with one of the back up operating systems.

As an example, consider the following: When a computer appliance attempts to boot up, the BIOS component will first attempt to boot using the primary operating system that is resident on partition 202a of the main disk 202. If, for some reason during boot up, the boot up operation fails, the BIOS component is programmed to attempt to boot the appliance using the secondary operating system that is resident on partition 202b of main disk 202. Continuing, if the boot up operation fails using the secondary operating system of partition 202b, then the BIOS component is programmed to attempt to boot the appliance using the primary operating system that is resident on partition 202a of mirror disk 204. If this boot up operation fails, then in this example, the last resort is for the BIOS component to attempt to boot the appliance using the operating system that is resident on partition 204b of mirror disk 204.

The primary goal of this system is to place the computer appliance into an operating state without the need for any human intervention. This is achieved, in the described embodiment, by having software redundancy in the form of multiple operating systems that can be accessed by the BIOS component during the boot up process.

Exemplary Computer Appliance Booting Method

Figure 3:
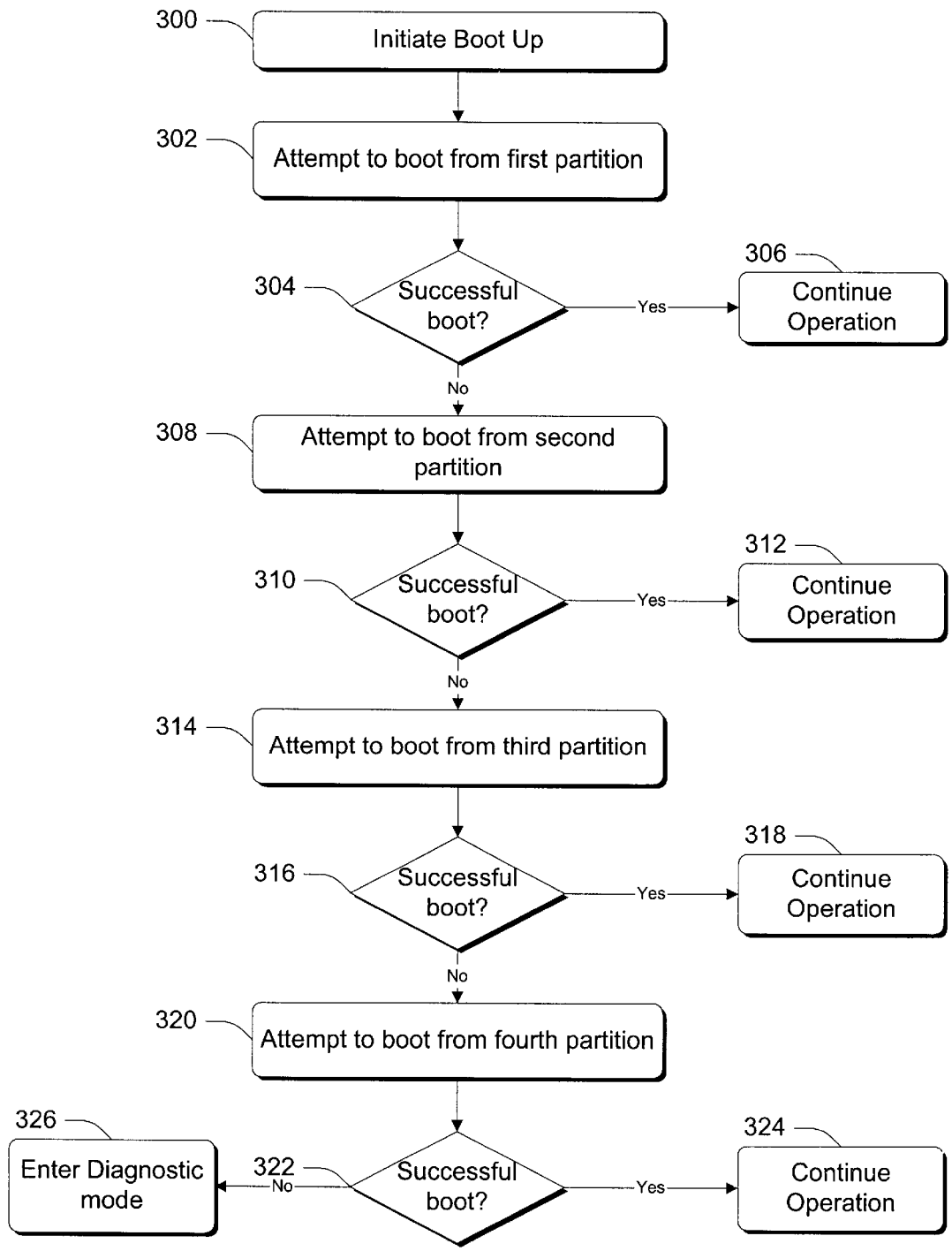
FIG. 3 is a flow diagram that describes steps in a method in accordance with the described embodiment.

FIG. 3 is a flow diagram that describes steps in a method in accordance with the described embodiment. The steps can be implemented in any suitable hardware, software, firmware or combination thereof. In the described embodiment, many of the steps are performed by an appliance's BIOS component.

Step 300 initiates the boot up process for an appliance. At step 302, the appliance attempts to boot up from a first partition of the hard drive. An exemplary first partition might comprise partition 202a (FIG. 2). Step 304 determines whether the boot was successful. For a boot to be successful, an appliance should be placed into a desired operating state. In this operating state, an appliance should be able to perform all or most of the functions for which it is intended. There may be some instances when an appliance will be considered to have booted successfully, yet it might lack some of its intended functionality. Because appliances can vary greatly in their functionalities, the functionalities that can be lacking and still result in a successful boot will vary as well. If step 304 determines that the boot has been successful, then operation of the appliance will continue (step 306). If, on the other hand, step 304 determines that the appliance has not booted successfully, then step 308 attempts to boot the appliance from a second partition of the hard drive. An exemplary second partition might comprise partition 202b (FIG. 2). Step 310 then determines whether the boot was successful. If the boot was successful, then operation of the appliance continues (step 312). If, on the other hand, the boot is not successful, then step 314 attempts to boot the appliance from a third partition of the hard drive. The third partition might comprise partition 202a of hard disk 204 (FIG. 2). Step 316 then determines whether the boot is successful. If it is, then operation of the appliance continues (step 318). If the boot is not successful, then step 320 attempts to boot the appliance from a fourth partition of the hard drive. This partition might comprise partition 204b of hard disk 204. If the boot is successful (step 322), then operation of the appliance continues (step 324). If, on the other hand, the boot is unsuccessful, then the appliance enters a diagnostic mode (step 326).

In the illustrated example, the code that implements the boot up redundancy can be adapted to many different appliances. These appliances will, necessarily, have varying considerations as to what constitutes a successful boot. In addition, these appliances will have variances as to what constitutes a diagnostic mode. Accordingly, one of the aspects of the inventive methods and systems provides a generalized framework for handling many different types of appliances. The framework is adaptable, for example by OEMs that design software or hardware for the appliances, so that the appliances behave in a manner that is consistent with the designer's intentions, yet still conform to some degree of redundancy that assures better reliability. For example, an appliance can be modular in the sense that OEMs can design and use pluggable drivers (e.g. printer drivers, display drivers, soft power drivers and the like) that essentially plug into the appliance. The redundancy system described above and below can, in line with the plugability of the appliance, be adapted to accommodate the different drivers that the OEMs might design. In this sense, one of the advantageous features of the described embodiment is its adaptability to different appliance scenarios.

Boot Count Variable

In the described embodiment, a so-called "boot count" variable is defined and used as an accounting measure in administering the boot up redundancy function. The boot count variable tracks the number of boot attempts for a particular appliance. If the boot count variable reaches or exceeds a predetermined or predefined threshold value, then the appliance BIOS is programmed to boot from another disk partition. If there is no other disk partition from which to boot, the appliance enters a diagnostic mode. In some instances, OEMs or manufacturers can set the threshold value to whatever value is appropriate for their particular appliance.

Figure 4:
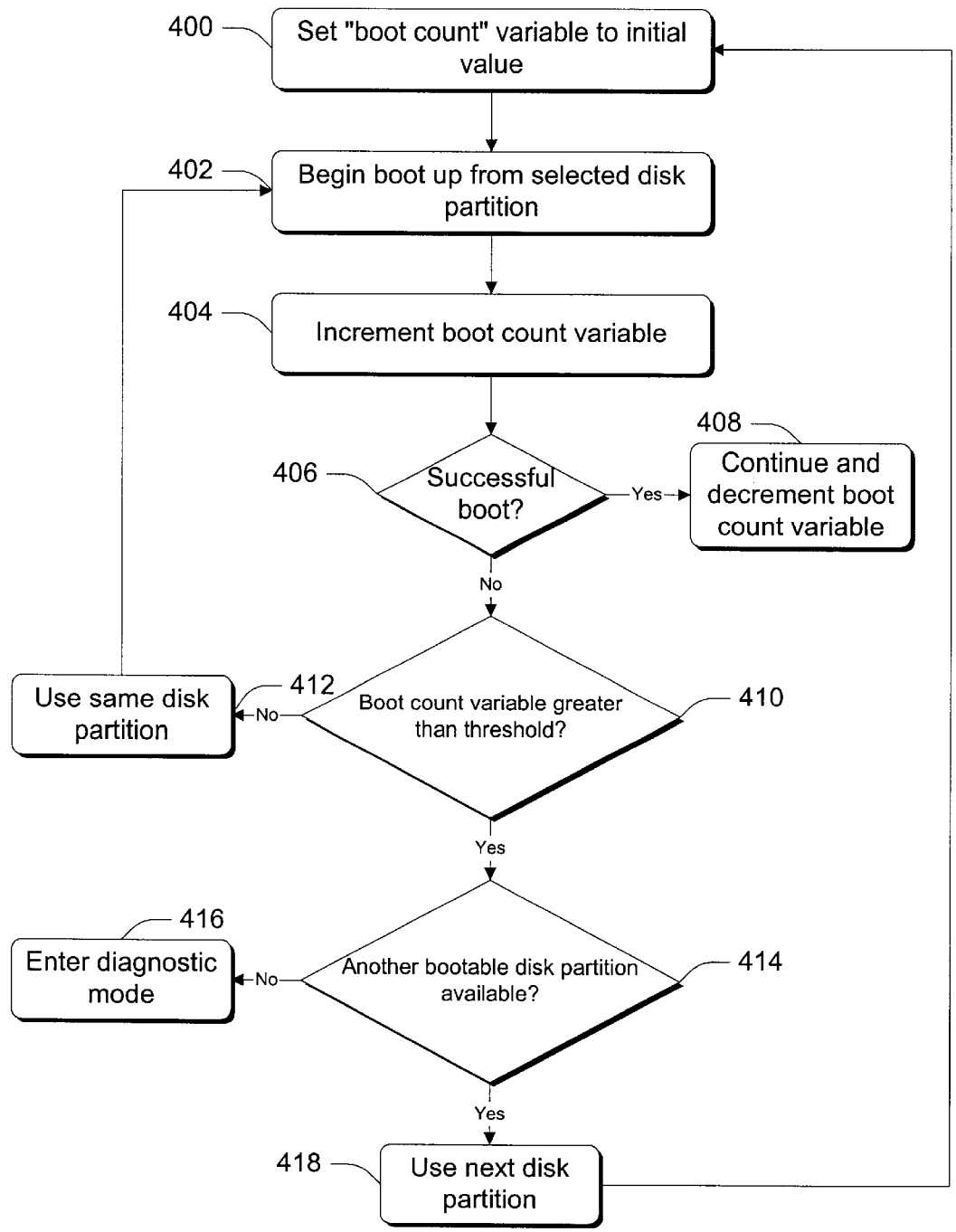
FIG. 4 is a flow diagram that describes steps in a method in accordance with the described embodiment.

FIG. 4 shows an exemplary flow diagram that describes processing steps that utilize a boot count variable in accordance with the described embodiment. During boot up attempts, the boot count variable is maintained in the appliance's non-volatile RAM. When an appliance is deployed, step 400 sets or assigns the boot count variable to an initial value, e.g. "0". Step 402 begins the boot up process from a selected disk partition. Examples of selected disk partitions are given above. When boot up from the selected disk partition is initiated, step 404 increments the boot count variable from its initial value. Step 406 determines whether the boot up process was successful. If the boot up process was successful, then step 408 continues processing and decrements the boot count variable. In the described embodiment, software in the operating system is programmed to set the boot count variable back to "0" in the event of a successful boot. If, however, the boot up process was not successful, step 410 ascertains whether the boot count variable satisfies a predefined relationship relative to the threshold value. In this example, the step determines whether the boot count variable is greater than the threshold value. If the boot count variable is not greater than the threshold value, then the system BIOS uses the same disk partition (step 412) and re-initiates the boot up process by returning to step 402. If, however, the boot count variable is greater than the threshold value, step 414 determines whether there is another bootable disk partition that can be used to boot the appliance. If there is another bootable disk partition, then step 418 uses the next disk partition, returns to step 400 to reset the boot count variable, and attempts to boot the appliance from the selected partition. If there is no other disk partition to use for the boot up process, the appliance enters a diagnostic mode at step 416.

The above exemplary boot up process ensures that an appliance's BIOS component will have at least one other disk partition from which to boot, in the event that the appliance fails to boot for whatever reason from the first-attempted disk partition. Having a boot count variable that is measured against a definable threshold value gives a degree of tolerance for the appliance in that booting can be attempted from a selected disk partition any number of practical times before moving on. This helps to ensure that a glitch in the first-attempted boot up from a selected disk partition does not preclude using that same disk partition to make second and/or additional attempts to boot the appliance.

Exemplary Computer Appliance Architecture

The described embodiment makes use of various software/hardware components to reduce the chances that a computer appliance will need human intervention in the event that a system failure occurs. These components all work together to achieve this goal. The components can be arranged and considered in four groups. It will be appreciated that the described groupings of components is not intended to limit the invention in any way. Accordingly, other groupings of components that achieve the above-stated goal can be used without departing from the spirit and scope of the invention.

A first of the groups can be considered as the redundant operating system with recovery capabilities. This group was described in connection with FIGS. 2 and 3. A second of the groups can be considered as the system BIOS operation, an example of which was described above in connection with FIG. 4. The third and fourth component groups can be considered as resource monitoring services and as a monitoring timer respectively. These last two groups are described in connection with FIGS. 5 and 6.

Resource Monitoring Services and Monitoring Timer

Figure 5:
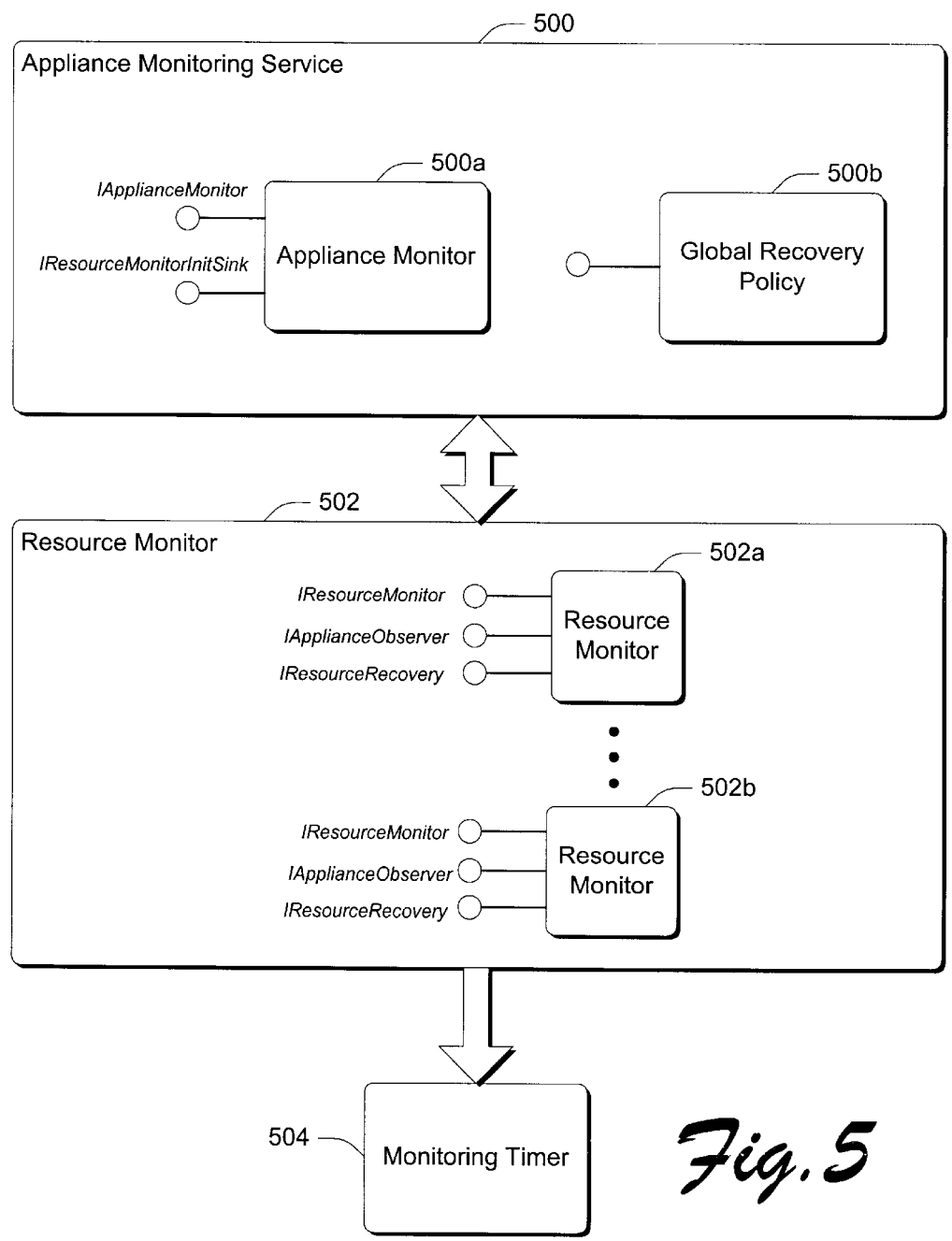
FIG. 5 is a block diagram of an exemplary computer appliance architecture in accordance with the described embodiment.

FIG. 5 shows an exemplary architecture for use in monitoring for and recovering from system failures. The illustrated components include an appliance monitoring service 500, resource monitor 502, and a monitoring timer 504. In the described embodiment, the appliance monitoring service 500 and the resource monitors 502 are implemented in software, and the monitoring timer is implemented in software/hardware. Having the monitoring timer implemented in software/hardware provides an added degree of reliability because hardware tends to fail less often than software. Of course, it is possible to implement the monitoring timer in software alone, although this is less desirable.

Resource monitor 502 is a software component that functions to detect failure conditions associated with various appliance resources and attempts to adapt to or fix them. In the described embodiment, individual appliance resources are monitored by individual resource monitoring components. Monitoring takes place during the boot up process as well as during operation of the appliance after a running state is achieved. The monitoring components are programmed to monitor the status of an associated computer appliance resource and to detect a failure condition in which the resource might not or cannot be used by the computer appliance for its intended purpose. Individual resource monitoring components are also programmed to attempt to remedy one or more failure conditions in the event that one is detected. In the illustrated example, two exemplary resource monitoring components 502a, 502b are shown implemented as programming objects (e.g. COM objects) with one or more interfaces that can be called by other components. An interface can be considered as a collection of one or more semantically related methods that can be called. Individual interfaces are illustrated by the plug notation in the figure. In the illustrated example, each resource monitoring object has three interfaces that are discussed in more detail below.

Appliance monitoring service 500 is a system-wide monitor that is programmed to attempt to remedy failure conditions that cannot be remedied by one or more of the resource monitoring components. In the illustrated example, the appliance monitoring service includes two components—an appliance monitor 500a and a global recovery policy module 500b.

The appliance monitor 500a is implemented, in this example, as a programming object having one or more interfaces. The appliance monitor 500a implements a state machine that essentially maintains a global state of the appliance (i.e. initializing, running, recovering, shutting down, and the like). The inputs to the state machine originate from the resource monitoring components 502a, 502b, as well as other "appliance aware" services. The action routines for the state machine events handle boot count manipulation (the boot count and fail over mechanisms described above), system event log reporting, appliance power off, appliance reset, and invocation of the global recovery policy module 500b.

Global recovery policy module 500b is implemented as a plug in component that implements resource recovery algorithms. Input into the global recovery policy module 500b consists of a set of attributes (properties) that describe a specific resource failure condition. The module then reacts to the failure condition by running a recovery algorithm. The level of service disruption caused by a global recovery operation can run the gamut from no disruption (the user is unaware that a problem has occurred) to a total disruption (worst case fail over to an alternate operating system). A primary function of the global recovery policy module is to handle failure conditions that cannot be handled by an associated resource monitoring object. The global policy module is pluggable in that it can be modified, as required, to deploy updated resource recovery algorithms.

Monitoring timer 504 is a mechanism that is used to detect software failures. In the described embodiment, the monitoring timer 504 detects failures in the resource monitoring components 502a, 502b. In this particular example, the monitoring timer 504 is configured to receive periodic notifications (pings) that are generated and sent from a special resource monitoring component in accordance with a definable frequency. The absence of such notifications is indicative of the failure of the resource monitoring service. In the described embodiment, all of the resource monitoring components are in process. Hence, if a resource monitoring component misbehaves (causes an unhandled exception for example) then the resource monitoring service is terminated. This is turn, will terminate the periodic notifications that are being generated and sent by the special resource monitoring component. When this happens, the system assumes that there has been a software failure and the system is reset (i.e. rebooted). This prevents failures in the resource monitoring components from hanging the system.

Exemplary Monitoring Method Using the Appliance Architecture

Figure 6:
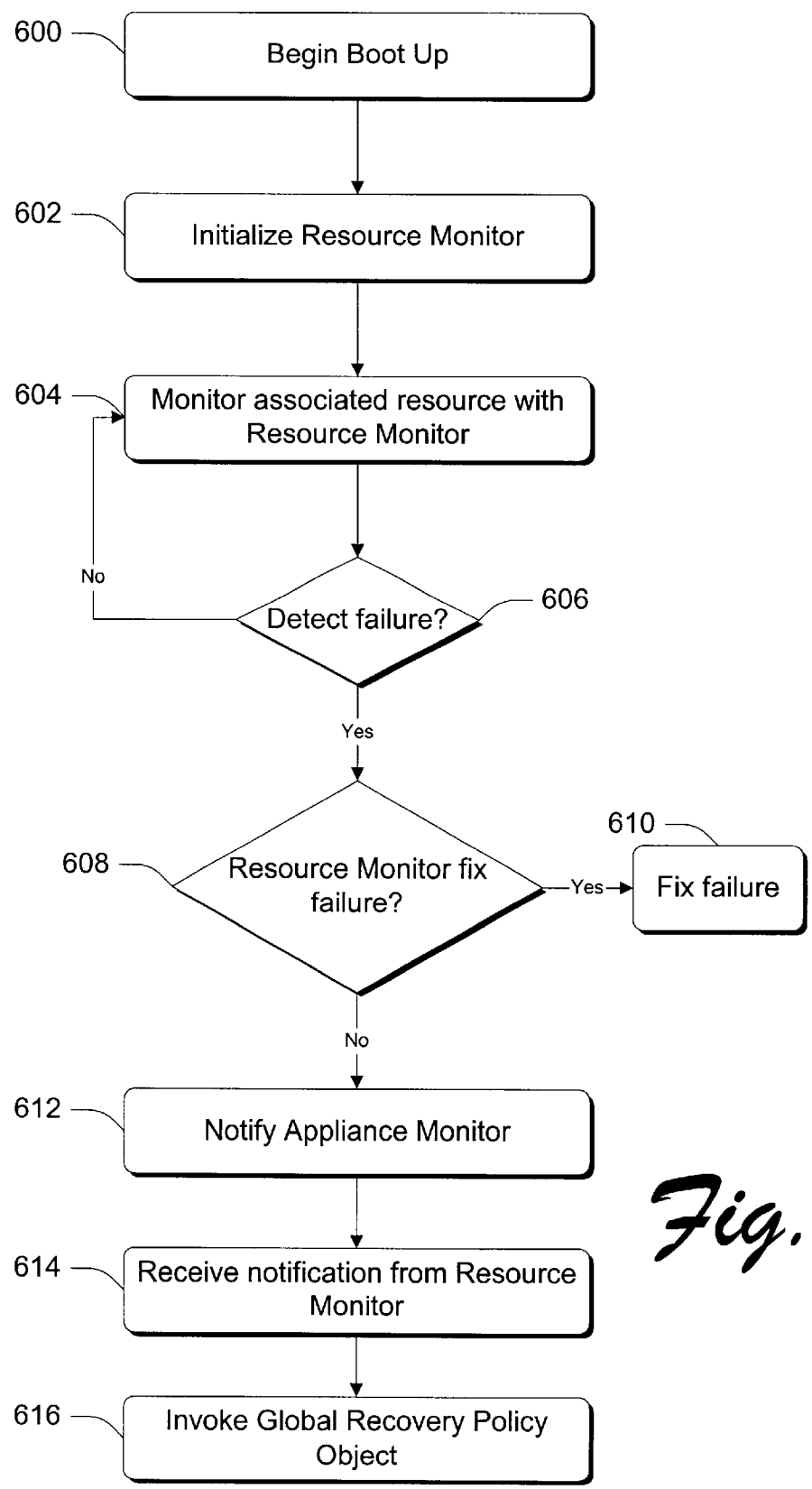
FIG. 6 is a flow diagram that describes steps in a method in accordance with the described embodiment.

FIG. 6 shows a flow diagram that describes steps in a monitoring method in accordance with the described embodiment. This particular method can be implemented using the appliance architecture of FIG. 5.

Step 600 initiates the boot up process for an appliance and step 602 initializes one or more of the resource monitoring components 502a, 502b. After the resource monitoring components have been initialized, each resource monitoring component monitors its associated resource (step 604). At step 606, each of the resource monitoring components having an associated resource to monitor determine whether there is a failure condition. The step can be implemented by having the resource monitoring component poll its associated resource or methods that return metrics about the resource's operation. Examples of this are given below. If no failure is detected, then the method returns to step 604 and continues monitoring the associated resource. if, on the other hand, step 606 detects a failure, then step 608 determines whether it is of the type of failure that can be remedied or fixed by the individual resource monitoring component. Each of the individual resource monitoring components can be programmed to make this determination. If the failure condition is one that can be remedied by an associated resource monitoring component, then step 610 attempts to fix the failure condition. If, on the other hand, step 608 determines that the failure condition cannot be remedied by the resource monitoring component, then step 612 notifies the appliance monitoring service 500 (FIG. 5). In the described embodiment, notification takes place by calling an interface on the appliance monitoring object 500a as will become apparent below. The appliance monitoring object 500a then receives the notification (step 614) from the resource monitoring component and invokes the global recovery policy object (step 616). As indicated above, the global recovery policy object maintains a collection of recovery algorithms that can be used to attempt to recover the resource. The recovery algorithms are designed to make decisions concerning whether the operating system has failed, whether a reboot can recover the system, or whether recovery can be accomplished in place (without rebooting and with little or no end user service disruption).

Example Implementation

Consider the following example of a server appliance that executes a subsystem of Microsoft's WIN32 operating system. The server appliance is designed to have filing sharing, Internet sharing, and print sharing capabilities. In the illustrated example, there are four resource monitoring components—a virtual machine monitor, a paged memory monitor, a process monitor, and a WMI service monitor.

Virtual Machine Monitor

The Virtual Machine Monitor (VMM) is responsible for controlling the operation of a virtual machine that includes a local display driver, monitoring timer driver, soft power switch driver, and a non-volatile RAM driver. The VMM resource monitoring object (RMO) controls the following virtual machine functions based on system status information it receives from the appliance monitoring service (e.g. 500 in FIG. 5):

1) Monitoring Timer Start/Stop

The VMM RMO begins monitoring timer pings upon being initialized by the appliance monitoring service. The VMM stops timer pings during appliance shutdown. The timer represents a hardware supported system failure detection and recovery mechanism. If it does not receive a periodic keep-alive (ping) call from the software, it reacts by rebooting the system.

2) Soft Power Switch Poll Interval

The VMM RMO begins polling the soft power switch driver upon being initialized by the appliance monitoring service. The VMM stops polling the soft power switch driver when the appliance is shutting down.

3) Display System Status

Certain system states (shutting down, booting, initializing, etc.) are reflected at the server appliance local display (if present). The VMM RMO registers for appliance state notifications and reports system states to the Local Display components as appropriate.

Paged Memory Monitor

The System Memory Monitor (SMM) is responsible for tracking system paged virtual memory utilization and reacting to low memory conditions. The System Memory Monitor operates by polling an ntdll.dll service GlobalMemoryStatus( ) at 200 millisecond intervals (the poll interval is configurable). The GlobalMemoryStatus( ) function returns metrics about system memory utilization including the amount of free space in the page file. If the amount of free space in the page file is less than 10% 10% is a configurable trigger value) of the total page file size, then the SMM advises the appliance monitoring service that a critical error has occurred. The goal of this mechanism is to detect memory exhaustion before memory allocation requests begin to fail. The reason for this mode of operation is that many applications do not properly recognize and react to memory allocation failures.

In this example, the resource monitoring component cannot remedy the failure condition. Specifically, memory resources cannot be directly recovered by the SMM. Instead, the SMM notifies the appliance monitoring service that a critical error has occurred, i.e. (OUT_OF_MEMORY). The critical error is then fed into the appliance state machine that reacts by invoking the global recovery policy module 500*b* (FIG. 5). The global recovery policy module 500*b* handles an out of memory problem by terminating services in the critical service set (i.e. the set of service applications providing end user services). Once services have been terminated, the appliance state machine sends out a state change notification (from RECOVERING to RUNNING). If the SMM determines that the problem was addressed upon receiving the state change notification (page file space is below threshold levels) then it continues with its monitoring chores and the services in the critical service set are automatically restarted by the appliance monitoring Process Monitor The Process Monitor is responsible for detecting unhandled process exceptions. The Process Monitor reacts to process exceptions by informing the appliance monitoring service that a critical system error has occurred.

In this example, the Process Monitor is implemented as a Windows executable (svrappeh.exe) that is invoked by the NT Executive when an unhandled exception occurs (AeDebug key points at svrappeh.exe). The Process Monitor uses the Win32 debug application program interfaces (APIs) to glean information from the problematic process. Information about the process is then provided to the appliance monitoring service (the Process Monitor performs no recovery functions itself) after which the problematic process is terminated.

Process interdependencies can form a very complex graph (which is not necessarily acyclic), especially when COM is employed for inter-process communication (consider the case where process X has a COM reference to process Y then process Y fails leaving process X unable to perform its intended function). Although it may be possible to track these dependencies from outside the core operating system, it is probably not feasible to do so (the implementation of such a mechanism might prove extremely rigid, capable of handling only a subset of the possibilities, or it might prove difficult to maintain over time given changes to operating system interfaces and mechanisms). Accordingly, process recovery is as follows:

If the appliance is in the RUNNING state, log the process error and continue (deem the process failure as non-critical). If the process that failed is an element of the critical services set, it will be restarted by the Services Monitor (a subcomponent of the appliance monitoring service).

If the Appliance is in the INITIALIZING state, then treat the failure as a critical error. While in the initializing state, all critical errors result in a reboot of the appliance. If the problem persists across boots, then BIOS will attempt to boot from the pristine operating system. The pristine operating system can operate by disabling the errant process in the primary operating system (depending on whether or not the errant process disrupts end user services) or notifying the end user (via the local display which may be as simple as a back lit icon) that a critical error has occurred.

WMI Service Monitor

The WMI Service Monitor is responsible for detecting instances where winmgmt.exe on Windows NT SP5 enters a state where it disallows local connections. While winmgmt.exe is in this state, several appliance components cannot operate properly resulting in service disruption. This state may be caused by one or more errant in-process WMI provider components.

The WMI Service Monitor polls winmgmt.exe and attempts to establish a local connection to WMI at a configurable interval, e.g. 45 seconds. If a connection cannot be established, a critical error (service failure) is reported to the appliance monitoring service. The appliance monitoring service responds to the critical service failure by invoking the global recovery policy module ( 500*b* FIG. 5). The global recovery policy module handles a service failure by terminating the process of the errant service and the processes of any services dependent upon it. The services are then automatically restarted by the appliance monitoring service.

Exemplary Application Programming Interfaces

The described embodiment makes use of a number of application program interfaces (APIs), examples of which are illustrated in FIG. 5.

The following table illustrates exemplary interfaces that are or can be exported by the appliance monitor object 500*a*, and each resource monitoring object (e.g. resource monitoring objects 502*a*, 502*b*).

| Programming Object | Interfaces |
|---|---|
| Appliance Monitoring Object | IApplianceMonitor, IResourceMonitorInitSink |
| Resource Monitoring Object | IResourceMonitor, IApplianceObserver (optional) |

The following is a description of each of the above identified interfaces.

IApplianceObserver

This interface is provided so that resource monitors that wish to receive appliance events can receive them.

The interface includes the following enumeration:

```
typedef enum _APPLIANCE_STATE
{
APPLIANCE_STATE_INITIALIZING, // Appliance is initializing
    APPLIANCE_STATE_RUNNING,// Appliance is up and running
    APPLIANCE_STATE_RECOVERING,// Appliance is self healing
    APPLIANCE_STATE_SHUTDOWN_PENDING, // Appliance
is shutting down
    APPLIANCE_STATE_SHUTDOWN,// Appliance is shutdown
    // New states can be added here
    APPLIANCE_STATE_MAX
} APPLIANCE_STATE;
interface IApplianceObserver : IUnknown
{
////////////////////////////////////////////////////////////////
//
// Function:    OnApplianceStateChange ( )
//
// Synopsis:   Used to report appliance state changes to observers
//
// Inputs:     eCurrentState: Current appliance state (a value from
//             the APPLIANCE_STATE enumeration).
//
// Outputs:    None
//
// Return:     S_OK: Observer has received the event.
//
// Notes:      The observer should return as quickly as possible from
//             this routine. If significant processing must occur as
//             a result of an appliance state change then the
//             observer should perform the work on a separate thread.
//             If an observer does not follow the interface contract
//             and return as quickly as possible then other system
//             components may not operate properly. The Appliance
//             Monitor uses an internal thread to notify observers.
//             If that thread is taken by an observer then other
//             observers are not notified and subsequent state
//             changes notifications cannot be sent.
//             Appliance services are unavailable while the appliance
//             is self recovering (APPLIANCE_STATE_
//             RECOVERING). The
//             Appliance UI components recognize this state and may
//             react by advising the user on the client PC that the
//             appliance is "healing" and that no services are
//             available until the appliance is "healed".
//
//             Note that system recovery differs from resource
//             recovery in that system recovery is the act of
//             recovering a failed OS (a failed OS occurs when a
//             resource (hardware or software cannot be recovered by
//             rebooting the system).
////////////////////////////////////////////////////////////////
HRESULT
OnApplianceStateChange (
                        [in] APPLIANCE_STATE eCurrentState
                        );
};
```

IResourceMonitorInitSink

This interface is exported by the appliance monitor object and is used by the resource monitoring objects to report initialization status. The interface includes the following enumeration:

```
typedef enum _RM_INIT_STATUS
{
    RM_INIT_SUCCEEDED,// Monitor successfully initialized
    RM_INIT_FAILED      // Monitor failed to initialize
} RM_INIT_STATUS;
interface IResourceMonitorInitSink : IUnknown
{
////////////////////////////////////////////////////////////////
//
// Function:    OnInitComplete( )
//
// Synopsis:   Used by resource monitors to provider the Appliance
//             Monitor with initialization status.
// Inputs:     eInitStatus: Final initialization status. If the
//             monitor has successfully initialized it should set
//             the eInitStatus parameter to
//             RM_INITIALIZATION_SUCCEEDED.
//             Otherwise a value of
//             RM_INITIALIZATION_FAILED should be specified.
//
// Outputs:    None
//
// Return:     S_OK: Function succeeded and the monitor
//             initialization status has been recorded.
//
// Notes:      If this function is invoked with eInitStatus set to
//             RM_INITIALIZATION_SUCCEEDED then the
//             Appliance Monitor will use the resource monitor's
//             registry settings to determine if it acts as an observer.
//
////////////////////////////////////////////////////////////////
HRESULT
OnInitComplete (
                [in] RM_INIT_STATUS eInitStatus
                );
};
```

IApplianceMonitor

This is the primary interface on the appliance monitor object and includes the following enumeration:

```
typedef enum _APPLIANCE_RESET_REASON
    {
    APPLIANCE_RESET_UNKNOWN = 0, // Reason not specified.
    APPLIANCE_RESET_USER, // User (admin) requested reset
    APPLIANCE_RESET_SOFT_POWER,// Soft power
switch was pressed
    APPLIANCE_RESET_SERVICE, // Service requested
system reset
    APPLIANCE_RESET_RESOURCE_FAILURE,//
Unrecoverable resource
failure
    APPLIANCE_RESET_RMO_FAILURE, // RMO
reported failure
    // New reset reasons can be inserted . . .
    APPLIANCE_RESET_INVALID // Range checking
    } APPLIANCE_RESET_REASON, *PAPPLIANCE_RESET_
REASON;
    typedef enum _RESOURCE_FAILURE_REASON
    {
    RESOURCE_FAILURE_UNHANDLED_EXCEPTION,
    // Process UE
    RESOURCE_FAILURE_OUT_OF_MEMORY,// System
is out of memory
    RESOURCE_FAILURE_HARDWARE_FAILURE,
    // Hardware failure
    RESOURCE_FAILURE_NETWORK_FAILURE,  // Com-
    munication failure
```

```
        RESOURCE_FAILURE_SYSTEM_UPDATE_FAILED,
//System update failed
        RESOURCE_FAILURE_SERVICE_INOPERABLE,
//  Service is not operating
        RESOURCE_FAILURE_CANNOT_RECOVER,
        // Resource failure
        // New failure reasons can be inserted here . . .
        RESOURCE_FAILURE_INVALID // Range checking
} RESOURCE_FAILURE_REASON,
*PRESOURECE_FAILURE_REASON;
interface IApplianceMonitor : IDispatch
{
////////////////////////////////////////////////////////////
//
// Function:    ResetAppliance( )
//
// Synopsis:    This function is used to initiate an orderly
//              appliance reset (reboot).
// Inputs:      eReason: Reason for the appliance reset. Must be a
//                       value from the APPLIANCE_RESET_
//                       REASON enumeration.
// Outputs:     None
//
// Return:      S_OK: Appliance shutdown is pending.
//
//              E_INVALIDARG: Invalid argument specified
// Notes:       The Appliance Monitor responds to this request by
//              transitioning into the SHUTDOWN_PENDING state.
//
////////////////////////////////////////////////////////////
[id(1)]
HRESULT
ResetAppliance (
                [in] APPLIANCE RESET REASON eReason
                );
////////////////////////////////////////////////////////////
//
// Function:    ReportResourceFailure ( )
//
// Synopsis:    This function is used to report a resource failure.
//              A resource failure occurs when a resource monitoring
//              component detects a failure but is unable to recover
//              the failed resource.
//
// Inputs:      lFailureReason: Value that identifies why the
//                              resource(specified by the
//                              pszResourceType and pFailureData
//                              parameters) failed.

//              pszResourceType: Pointer to the stringized GUID of
//                              failed resource.

//              pszFailureMsgParams: Pointer to a variant of type
//                              VT_ARRAY | VT_BSTR
//                              containing the failure message
//                              replacement strings.

//              pFailureData: Pointer to a variant of type
//                              VT_ARRAY | VT_UI1 containing
//                              information about the resource failure.
//                              Such information may be used to
//                              identify the failed resource within a
//                              set of homogeneous resources. The
//                              format and content of the data is based
//                              on the resource type and failure
//                              reason.
//
// Outputs:     None
//
// Return:      S_OK: Function succeeded and the resource failure
//                    has been recorded.
//
//              E_INVALIDARG: Invalid argument specified
//
////////////////////////////////////////////////////////////
[id(2)]
HRESULT
ReportResourceFailure (
                [in] LONG                   lMsgID,
                [in] RESOURCE_              eFailureReason,
                FAILURE_REASON
                [in] BSTR                   pszResourceType,
                [in] VARIANT*               pszFailureMsg-
                                            Params,
                [in] VARIANT*               pFailureData
                );
////////////////////////////////////////////////////////////
//
// Function:    GetResetReason( )
//
// Synopsis:    This function is used to obtain the reason why
//              the system is being shutdown. It can be invoked from
//              within IApplianceObserver::OnApplianceStateChange.
//
// Inputs:      pReason: Pointer to memory that receives the reason
//                       for the appliance reset (value from the
//                       APPLIANCE_RESET_
//                       REASON enumeration).
// Outputs:     None
//
// Return:      S_OK: Function succeeded and appliance reset
//                    reason was retrieved.
//
//              E_INVALIDARG: Invalid argument specified
//
////////////////////////////////////////////////////////////
[id(3)]
HRESULT
GetResetReason (
                [out, retval] PAPPLIANCE_
                              RESET_REASON pReason
                );
};
```

IResourceMonitor

Components that monitor system wide resources must export this interface so that the resource monitoring is activated before other system components are started.

```
interface IResourceMonitor : IUnknown
{
////////////////////////////////////////////////////////////
//
// Function:    Initialize( )
//
// Synopsis:    Used to start resource monitor operation
//
// Inputs:      pAppMon: Pointer to the IApplianceMonitor interface
//                       exported by the Appliance Monitor.

//              pInitSink: Pointer to the IResourceMonitorInitSink
//                         interface exported by the
//                         Appliance Monitor. The Resource Monitor
//                         uses this interface to report status.
// Outputs:     None
//
// Return:      S_OK: Function succeeded and the monitor is
//                    attempting to start. Initialization status
//                    is returned via the IResourceMonitorInitSink
//                    interface pointed at by pInitSink.
//
//              E_FAILED: The monitor cannot be initialized. In this
//                        case no further initialization status is
//                        reported.
//
// Notes:       A Resource Monitor should initialize itself and begin
//              operation when this method is invoked. If monitor
//              initialization is a time consuming operation then the
//              monitor should AddRef( ) the given interface pointers and
//              continue initialization on a different thread. The
//              Resource Monitor should invoke
//              IResourceMonitorInitSink::OnInitComplete upon
```

```
//          completing initialization.
//
////////////////////////////////////////////////////////////
HRESULT
Initialize (
        [in] IApplianceMonitor*        pAppMon,
        [in] IResourceMonitorInitSink* pInitSink
        );
};
```

Aspects of the invention described above provide an automated, flexible, extendable appliance recovery system that greatly reduces the likelihood that human intervention is needed to recover an appliance that has experienced a system failure. In addition, the inventive methods and systems reduce the possibility that a particular system failure will disrupt end user services.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer appliance booting method comprising:
defining one or more resource monitoring components, individual ones of which being programmed to monitor the status of an associated computer appliance resource and detect a failure condition in which the resource cannot be used by the computer appliance for its intended purpose, at least some of the resource monitoring components being programmed to attempt to remedy the failure condition in the event that the resource monitoring component detects a failure condition, independent of notifying an appliance monitoring component that can remedy the failure condition, and being programmed to notify said appliance monitoring component in the event that the resource monitoring component cannot fix the failure condition;
defining said appliance monitoring component that is programmed to attempt to remedy failure conditions that cannot be remedied by the one or more resource monitoring components; and
monitoring one or more resources with said one or more resource monitoring components respectively, at least during a period of time when the computer appliance is attempted to be booted.

2. The computer appliance booting method of claim 1 further comprising:
determining whether a particular failure condition that is detected by a resource monitoring component is one that can be remedied by the associated resource monitoring component; and
attempting to remedy the particular failure condition using the associated resource monitoring component if the particular failure condition is one that can be remedied by the associated resource monitoring component.

3. The computer appliance booting method of claim 2 further comprising using the appliance monitoring component to attempt to remedy the failure condition in the event that the failure condition is one that cannot be remedied by an associated resource monitoring component.

4. The computer appliance booting method of claim 3, wherein said using comprises invoking a global recovery policy module that is programmed with a plurality of recovery algorithms individual ones of which can be implemented in connection with a failure condition.

5. The computer appliance booting method of claim 1, wherein said monitoring further comprises:
configuring a monitoring timer to receive periodic notifications the absence of which is indicative of the failure of a resource monitoring component;
generating one or more notifications for the monitoring timer; and
sending the one or more notifications to the monitoring timer.

6. The computer appliance booting method of claim 5 further comprising receiving the one or more notifications with the monitoring timer and, in the event that the notification are not received in accordance with a definable frequency, rebooting the computer appliance.

7. The computer appliance booting method of claim 1, wherein the resource monitoring components comprise programming objects having one or more callable interfaces, one of the interfaces being callable to initiate said monitoring.

8. The computer appliance booting method of claim 1, wherein the appliance monitoring component comprises a programming object having one or more callable interfaces, one of the interfaces being callable by one or more of the resource monitoring components to report a failure condition.

9. The computer appliance booting method of claim 1, wherein;
the resource monitoring components comprise programming objects having one or more callable interfaces, one of the interfaces being callable to initiate said monitoring; and
the appliance monitoring component comprises a programming object having one or more callable interfaces, one of the interfaces being callable by one or more of the resource monitoring objects to report a failure condition.

10. A computer appliance architecture embodied on one or more computer-readable media, the architecture being configured for use in monitoring for, and attempting to remedy failure conditions associated with various resources of the computer appliance, the architecture comprising:
one or more resource monitoring components, individual ones of which being programmed to monitor the status of an associated computer appliance resource and detect a failure condition in which the resource cannot be used by the computer appliance for its intended purpose, at least some of the resource monitoring components being programmed to attempt to remedy the failure condition in the event that the resource monitoring component detects a failure condition, independent of notifying another component that can remedy the failure condition, and being programmed to notify an appliance monitoring service in the event that the resource monitoring component cannot fix the failure condition; and
said appliance monitoring service configured to be in communication with the one or more resource monitoring components and being programmed to attempt to remedy failure conditions that cannot be remedied by the one or more resource monitoring components.

11. The appliance architecture of claim 10, wherein the appliance monitoring service comprises an appliance monitoring object having at least one interface that is callable by the one or more resource monitoring components to report a failure condition that cannot be remedied by the one or more resource monitoring components.

12. The appliance architecture of claim 11, wherein the appliance monitoring service further comprises a global recovery policy module that comprises a plurality of invokable recovery algorithms that can be invoked to attempt to remedy failure conditions that cannot be remedied by the one or more resource monitoring components.

13. The appliance architecture of claim 10, wherein the one or more resource monitoring components comprise resource monitoring objects, individual ones of which having an interface that is callable to activate the object's monitoring function.

14. The appliance architecture of claim 10 further comprising a monitoring timer component that is configured to receive periodic notifications the absence of which indicating that a resource monitoring component has failed.

15. A set of application program interfaces embodied on one or more computer-readable media for execution on a computer appliance, comprising:

a first interface to activate one or more resource monitoring objects for monitoring one or more resources that are used by a computer appliance, at least some of the resource monitoring objects being programmed to attempt to remedy the failure condition in the event that the resource monitoring object detects a failure condition, independent of notifying an appliance monitoring object that can remedy the failure condition, and being programmed to notify the appliance monitoring object in the event that the resource monitoring object cannot fix the failure condition; and a second interface for a resource monitoring object to use to report a failure of a resource that is monitored by the resource monitoring object.

16. The set of application program interfaces of claim 15 further comprising a third interface to report appliance state changes to one or more of the resource monitoring objects.

17. The set of application program interfaces of claim 15 further comprising a third interface for use by one or more of the resource monitoring objects to report their initialization status.

18. The set of application program interfaces of claim 15 further comprising a third interface to initiate reboot of the computer appliance.

19. The set of application program interfaces of claim 15 further comprising a third interface to obtain a reason why an appliance is being shut down.

* * * * *